United States Patent
Williams et al.

(10) Patent No.: US 8,930,540 B1
(45) Date of Patent: Jan. 6, 2015

(54) DETERMINATION OF DEVICE USAGE PATTERNS

(75) Inventors: Steve Thomas Williams, Alpharetta, GA (US); Gregory Harold Harris, Woodstock, GA (US); Keith Betts Entwistle, Cumming, GA (US)

(73) Assignee: Cox Communications, Inc., Atlanta, GA (US)

( * ) Notice: Subject to any disclaimer, the term of this patent is extended or adjusted under 35 U.S.C. 154(b) by 59 days.

(21) Appl. No.: 13/288,898

(22) Filed: Nov. 3, 2011

Related U.S. Application Data (60) Provisional application No. 61/411,658, filed on Nov. 9, 2010.

(51) Int. Cl.
  *G06F 15/177* (2006.01)
  *G06F 15/173* (2006.01)

(52) U.S. Cl.
  USPC ............................ 709/226; 709/220; 709/223

(58) Field of Classification Search
  CPC ..................... H04L 29/12066; H04L 61/1511; H04L 61/302; H04L 61/2076
  See application file for complete search history.

(56) References Cited

U.S. PATENT DOCUMENTS

| | | | |
|---|---|---|---|
| 6,614,774 B1 * | 9/2003 | Wang | 370/338 |
| 7,162,538 B1 * | 1/2007 | Cordova | 709/238 |
| 8,135,395 B2 * | 3/2012 | Cassett et al. | 455/423 |
| 8,442,067 B2 * | 5/2013 | Bryan et al. | 370/458 |
| 2003/0033155 A1 * | 2/2003 | Peerson et al. | 705/1 |
| 2007/0100878 A1 * | 5/2007 | Fielding et al. | 707/102 |
| 2008/0027776 A1 * | 1/2008 | Sourov et al. | 705/8 |
| 2008/0034072 A1 * | 2/2008 | He et al. | 709/223 |
| 2010/0146325 A1 * | 6/2010 | John | 714/3 |
| 2010/0332990 A1 * | 12/2010 | Prahlad et al. | 715/735 |

OTHER PUBLICATIONS

Kucherawy "Message Header Field for Indicating Message Authentication Status" RFC 5451.*
RFC—5451—Message Header Field for indicating Message Authentication Status M. Kucherawy Apr. 2009.*

* cited by examiner

*Primary Examiner* — Joshua Joo
*Assistant Examiner* — Younes Naji
(74) *Attorney, Agent, or Firm* — Merchant & Gould P.C.

(57) ABSTRACT

A computer identifier is received at a first computing device. The first computing device then collects data from a second computing device. The second computing device is associated with the computer identifier. The first computing device uses the data to identify an appropriate time to schedule a task on the second computing device. The first computing device then schedules the task to be performed on the second computing device at the identified time.

17 Claims, 9 Drawing Sheets

DETERMINATION OF DEVICE USAGE PATTERNS

RELATED APPLICATION

This application claims the benefit of U.S. Patent Application Ser. No. 61/411,658, filed Nov. 9, 2010, the entire content of which is hereby incorporated by reference.

BACKGROUND

There are many situations in which a user needs to perform an operation on a computing device when the computing device is not otherwise being used. For example, an analyst may be performing an investigation into the activities of an employee. In this example, the analyst may need to extract data from the employee's computing device without the employee knowing about the investigation. Therefore, in this example, it would be helpful to the analyst to know when the employee's computing device is least likely to be in use.

SUMMARY

A first computing device receives a target list. The target list comprises at least one computer identifier. The first computing device then collects data from a second computing device. The second computing device is associated with the computer identifier. The first computing device uses the data to identify an appropriate time to schedule a task on the second computing device. For example, the first computing device can use the data to identify a time when the second computing device is most likely to have network connectivity and least likely to be in use. The first computing device schedules the task to be performed on the second computing device at the identified time.

DETAILED DESCRIPTION

The following description and the attached figures describe example embodiments. In the following description, reference numbers refer to like reference numbers in the figures. In the figures, items separated by ellipses indicate the presence of one or more similar items. Likewise, in the figures, stacked items indicate the presence of one or more similar items. Reference numbers having alphabetical suffixes A through N are not intended to convey the presence of a particular number of items.

As described briefly above, activities are scheduled to occur on particular computing devices. The activities are scheduled to occur at times that users of the computing devices are not likely to be using the computing devices and that the computing devices are likely to have network connectivity. A computing device identifies these times based on data collected from the computing devices.

Figure 1:
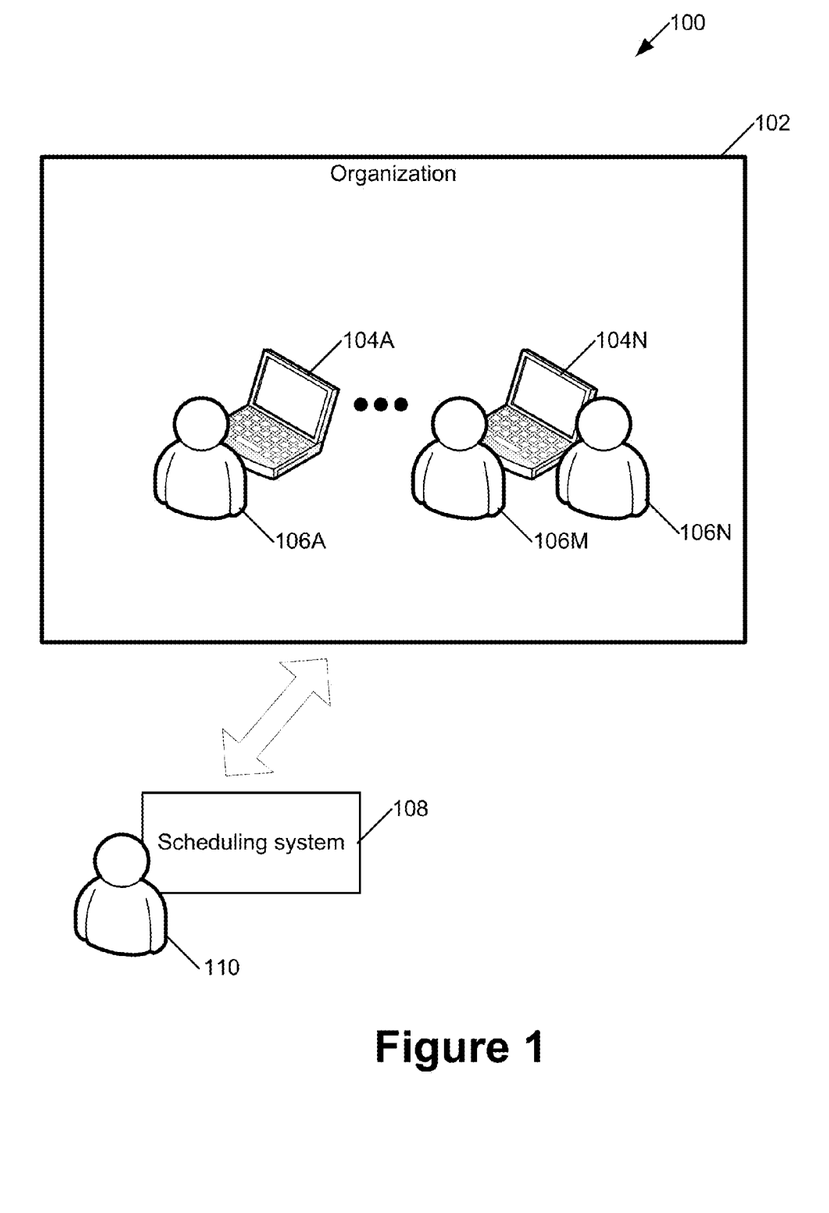
FIG. 1 is a block diagram illustrating an example system.

FIG. 1 is a block diagram illustrating an example system 100. As illustrated in the example of FIG. 1, the system 100 comprises an organization 102. In various embodiments, the organization 102 can be various types of entities. For example, the organization 102 can be a business enterprise, such as a corporation, partnership, company, proprietorship, or another type of business enterprise. In another example, the organization 102 can be another type of entity, such as a non-profit organization, a governmental organization, or a foundation.

The organization 102 has multiple computing devices 104A-104N (collectively, "computing devices 104"). In various embodiments, the computing devices 104 comprise various types of computing devices. For example, one or more of the computing devices 104 can be desktop computers, laptop computers, smartphones, tablet computers, thin-client computers, point-of-sale devices, workstations, and so on.

Users 106A-106N (collectively, "users 106") use the computing devices 104. The users 106 are individual people. The users 106 may be related to the organization 102 in various ways. For example, one or more of the users 106 may be employees of the organization 102. In another example, one or more of the users 106 may be customers of the organization 102, constituents of the organization 102, contractors of the organization 102, or have other relationships with the organization 102. As indicated in the example of FIG. 1, there can be instances where two or more of the users 106 share a single one of the computing devices 104.

Furthermore, the system 100 comprises a scheduling system 108. The scheduling system 108 comprises one or more computing devices. For example, the scheduling system 108 can comprise one or more personal computers, laptop computers, server computers, tablet computers, mainframe computers, standalone server computers, blade servers, and/or other types of computing devices. In the example of FIG. 1, the scheduling system 108 is shown as being located outside the organization 102. In other embodiments, the scheduling system 108 can belong to the organization 102.

As described in detail below, the scheduling system 108 collects data regarding the computing devices 104. The scheduling system 108 uses this data to identify appropriate times at which to perform tasks. For example, the scheduling system 108 can use this data to identify times when the computing devices 104 are likely to have network connectivity and are not likely to be used by the users 106. The scheduling system 108 then schedules activities to occur on the computing devices 104 at the identified times.

In some instances, it may be advantageous to schedule tasks to occur on computing devices at times when the computing devices 104 are likely to have network connectivity and not likely to be in use. For example, a task may involve installing software patches on the computing devices 104. In this example, installation of the software patches may require the computing devices 104 to restart. In this example, it may be inconvenient for the users 106 to restart their computing devices 104 during busy parts of their workdays.

Furthermore, in some instances, it may be advantageous to perform tasks on the computing devices 104 without the users 106 of the computing devices 104 knowing that the tasks are being performed. For example, a detective conducting a criminal investigation may need data stored on one of the computing devices 104. In this example, a task may involve periodically copying large amounts of data from the computing device. Transferring such data can significantly reduce the performance of the computing device. In this example, a user of the computing device may become suspicious if the user notices the reduced performance of the computing device. Therefore, in this example, the task may be scheduled to avoid times when the user is likely to be using the computing device.

An admin 110 uses the scheduling system 108. In various embodiments, the admin 110 uses the scheduling system 108 to perform various tasks. For example, the admin 110 can configure which tasks the scheduling system 108 schedules. In another example, the admin 110 can configure the scheduling system 108 to collect data from particular ones of the computing devices 104.

Figure 2:
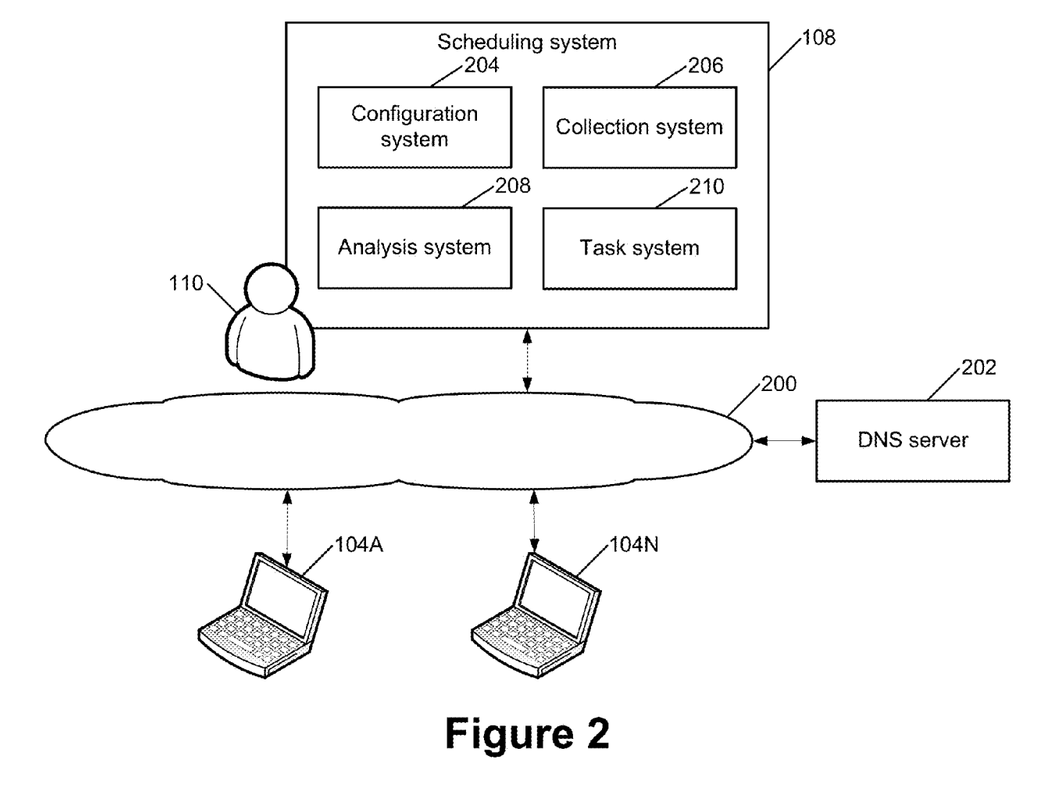
FIG. 2 is a block diagram illustrating details of a network system.

FIG. 2 is a block diagram that provides example details of the system 100. As illustrated in the example of FIG. 2, a network 200 facilitates communication between the scheduling system 108, the computing devices 104, and a DNS server 202. In various embodiments, the network 200 comprises various types of networks. For example, the network 200 can comprise a local area network, a wide area network, a campus area network, or another type of network. In some embodiments, the network 200 comprises the Internet. In various embodiments, the network 200 comprises wired and/or wireless communication links.

The DNS server 202 is provided by one or more computing devices. As described elsewhere in this document, the DNS server 202 receives DNS requests that specify hostnames. In response to such DNS requests, the DNS server 202 provides Internet Protocol (IP) addresses that correspond to the specified hostnames. Furthermore, in some embodiments, the DNS server 202 receives reverse DNS requests that specify IP addresses. In response to such reverse DNS requests, the DNS server 202 provides hostnames that correspond to the specified IP addresses.

The scheduling system 108 provides a configuration system 204, a collection system 206, an analysis system 208, and a task system 210. In various embodiments, the scheduling system 108 provides the configuration system 204, the collection system 206, the analysis system 208, and the task system 210 in various ways. For example, the scheduling system 108 can have access to one or more computer storage media that store instructions. In this example, the scheduling system 108 provides one or more of the configuration system 204, the collection system 206, the analysis system 208, and the task system 210 when one or more processing units in the scheduling system 108 execute the instructions. In another example, the scheduling system 108 comprises one or more application-specific integrated circuits (ASICs). In this example, the ASICs function to provide one or more of the configuration system 204, the collection system 206, the analysis system 208, and the task system 210.

As described in detail elsewhere in this document, the configuration system 204 enables the admin 110 to configure the scheduling system. The collection system 206 collects data from the computing devices 104. The analysis system 208 analyzes the data collected by the collection system 206 to identify appropriate times at which to perform tasks. For example, the analysis system 208 can analyze the collected data to identify times at which the computing devices 104 are likely to have network connectivity and are likely to not be in use. The task system 210 schedules tasks to occur on the computing devices 104. In some embodiments, the task system 210 interacts with the computing devices 104 to complete the tasks.

Each of the computing devices 104 is associated with an IP address. The IP addresses of the computing devices 104 can change over time. For example, the computing devices 104 can use a Dynamic Host Configuration Protocol (DHCP) system to temporarily lease IP addresses. In this example, the computing devices 104 can acquire new IP addresses when the leases on their IP addresses expire. The IP addresses of the computing devices 104 can change relatively frequently. For example, the computing devices 104 might have IP addresses for less than a day.

In some instances, one of the computing devices 104 can acquire an IP address previously used by a different one of the computing devices 104. For example, the computing device 104A can initially have a first IP address. In this example, the computing device 104A can later be assigned a second IP address and the computing device 104N can be assigned the first IP address.

Furthermore, each of the computing devices 104 is associated with a hostname. In some embodiments, the hostnames of the computing devices 104 are each different from one another. For example, the computing device 104A can have the hostname "jupiter.example.com." In this example, none of the other computing devices 104 have the hostname "jupiter.example.com." The hostnames of the computing devices 104 do not frequently, if ever, change. Thus, after the computing devices 104 are initially set up, the computing devices 104 can keep their hostnames permanently.

As described in detail elsewhere in this document, the collection system 206 collects data regarding the computing devices 104 over extended time periods. The IP addresses of the computing devices 104 can change during these time periods. Because the IP addresses of the computing devices 104 can change, the collection system 206 has no assurance that the same one of the computing devices 104 sent all the data having a given IP address as a source address.

However, the hostnames of the computing devices 104 are unlikely to change during these time periods. Thus, the collection system 206 uses the DNS server 202 to determine the IP addresses of the computing devices 104 from the hostnames of the computing devices 104. Furthermore, the collection system 206 uses the DNS server 202 to determine the hostnames of the computing devices 104 from the source IP addresses of data sent to the collection system 206. In this way, the collection system 206 is able to consistently associate the collected data with the hostnames of the computing devices 104.

Figure 3:
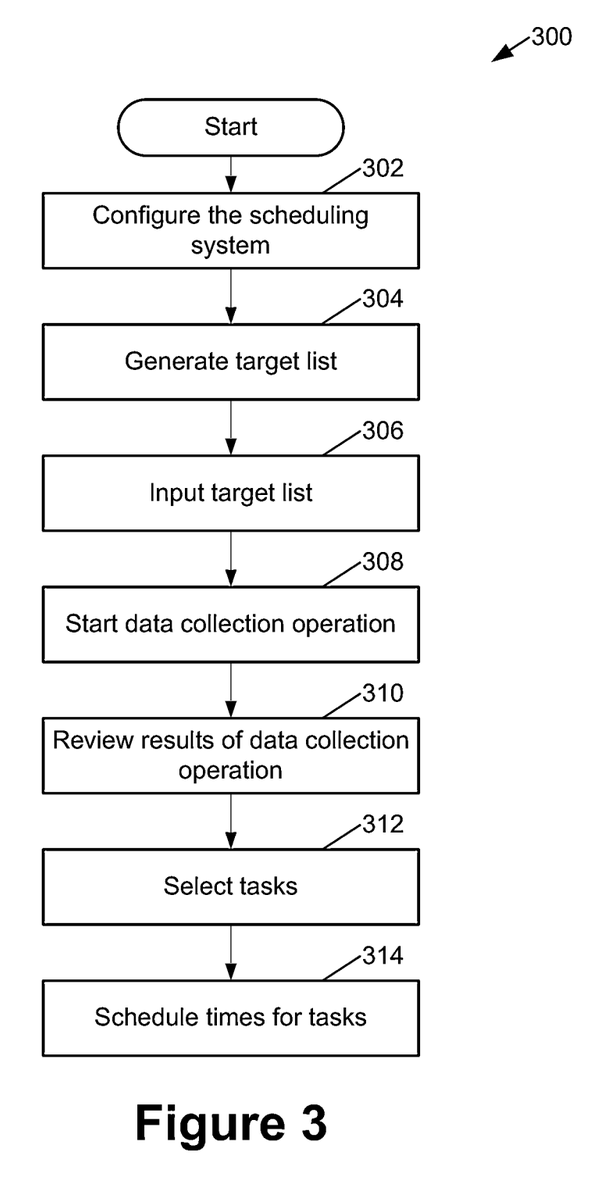
FIG. 3 is a flowchart illustrating an example operation performed by an analyst to schedule times for an operation on a computing device.

FIG. 3 is a flowchart illustrating an example operation 300 performed by the admin 110. After the operation 300 begins, the admin 110 configures the scheduling system 108 (302). In various embodiments, the admin 110 performs various actions to configure the scheduling system 108. For example, the admin 110 can configure the scheduling system 108 to collect particular types of data from the computing devices 104. In another example, the admin 110 can configure the scheduling system 108 with various credentials that the scheduling system 108 can use to access the computing devices 104 and/or decrypt data received from the computing devices.

Furthermore, the admin 110 generates a target list (304). The admin 110 then inputs the target list to the scheduling system 108 (306). The target list comprises one or more computer identifiers, such as hostnames or IP addresses. The one or more computer identifiers correspond to one or more of the computing devices 104. In various embodiments, the admin 110 generates the target list in various ways. For example, the admin 110 may be conducting electronic discovery as part of an ongoing lawsuit. In this example, one or more of the users 106 may be identified as having custody of documents that are relevant to the lawsuit. In this example, the target list can include the hostnames or IP addresses of the computing devices 104 used by the identified users.

After inputting the target list, the admin 110 starts a data collection operation on the scheduling system 108 (308). During the data collection operation, the collection system 206 collects data from ones of the computing devices 104 having computer identifiers in the target list. The data collected by the collection system 206 can include the types of data indicated by the admin 110 when the admin 110 configured the scheduling system 108.

Subsequently, the admin 110 can review the result of the data collection operation (310). In various embodiments, the results of the data collection operation can include various types of data. For example, the results of the data collection operation can indicate what times the computing devices 104 are likely to be in use. In this example, the results of the data collection operation can, for example, indicate that the computing device 104A is least likely to be in use at 3:30 a.m. on Tuesdays. In another example, the results of the data collection operation can indicate what times the computing devices 104 are likely to have network connectivity. In this example, the results of the data collection operation can, for example, indicate that the probability of the computing device 104A having network connectivity at 3:30 a.m. on Tuesdays is 0.5, the probability of the computing device 104A having network connectivity at 1:00 p.m. on Wednesdays is 0.9, and so on.

Furthermore, the results of the data collection operation can include other types of data regarding the computing devices 104. For example, the results of the data collection operation can indicate which users logged in to the computing devices 104, types of external media that attached to the computing devices 104, chassis types of the computing devices 104, times of high and low hardware resource utilization, rates of network utilization, and other data regarding the computing devices 104.

Based on the results of the data collection operation, the admin 110 selects which tasks are to be performed on particular ones of the computing devices 104 (312). For example, the results of the data collection operation can indicate that external media, such as a flash drive, are routinely attached to a given one of the computing devices 104 while a given one of the users 106 is logged in to the given computing device. Based on this data, the admin 110 can decide to install a software package on the given computing device. In this example, the software package may, for example, log data transferred to external media.

After selecting which tasks are to be performed on particular ones of the computing devices 104, the admin 110 schedules times to perform the selected tasks (314). In some embodiments, the admin 110 schedules the times to perform the selected tasks based on the results of the data collection operation. For example, the admin 110 can use the results of the data collection operation to identify times at which a given computing device is most likely to have network connectively and least likely to be in use. In this example, the admin 110 can schedule one of the selected tasks to be performed at one of the identified times. The analysis system 208 can, in some embodiments, automatically identify appropriate times at which the selected tasks can be performed.

Figure 4:
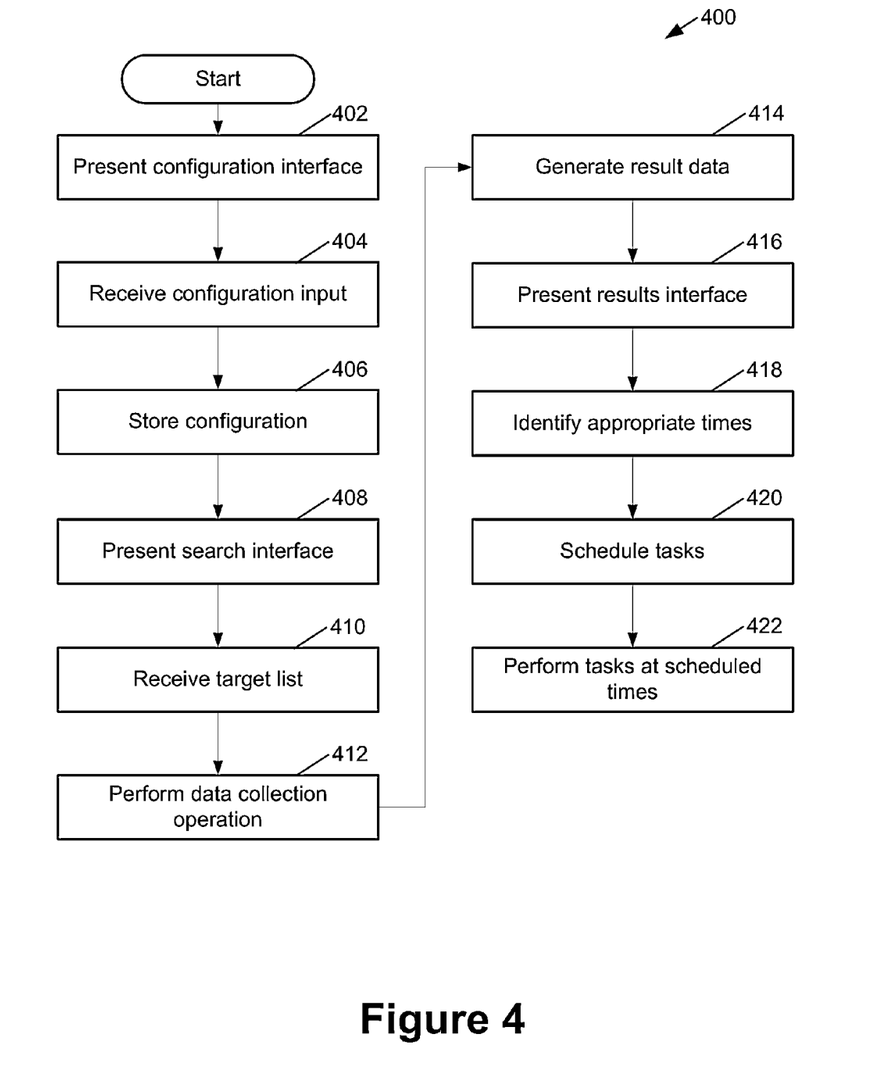
FIG. 4 is a flowchart illustrating an example operation performed by an analysis application.

FIG. 4 is a flowchart illustrating an example operation 400 of the scheduling system 108. After the operation 400 starts, the configuration system 204 presents a configuration interface to the admin 110 (402). The configuration interface comprises features that enable the admin 110 to configure the scheduling system 108.

Subsequently, the configuration system 204 receives configuration input from the configuration interface (404). The configuration system 204 stores data indicated by the configuration input.

In various embodiments, the configuration interface has various features and the configuration input can indicate various data. Such features can include text areas, textboxes, checkboxes, drop boxes, radio buttons, submit buttons, file browse buttons, and so on.

Various embodiments of the configuration interface enable the admin 110 to provide various configuration input. For example, some embodiments of the configuration interface include features that enable the admin 110 to input a list of properties. In this example, each of the properties indicates a distinct type of data regarding a computing device. Example types of data include chassis type, processor speed, network interface type, serial number, hard disk size, hard disk utilization, amounts of RAM, and so on.

Various embodiments of the scheduling system 108 present interfaces in various ways. For example, a display screen can be connected to the scheduling system 108. In this example, the scheduling system 108 can display interfaces directly on the display screen. In another example, the admin 110 uses a given computing device that is separate from the scheduling system 108. In this example, the scheduling system 108 presents interfaces by generating interface data and sending the interface data to the given computing device. The given computing device then processes the interface data to display the interface. For instance, the scheduling system 108 can generate Hypertext Markup Language (HTML) data. A web browser application on the given computing device renders the HTML data to display the interface.

After the configuration system 204 receives the configuration input, the configuration may be stored (406). The configuration system 204 may then present a search interface to the admin 110 (408). The search interface includes features that enable the admin 110 to input a target list. As discussed above, the target list comprises one or more computer identifiers, such as host names and/or IP addresses. In some embodiments, the search interface and the configuration interface are the same interface. The configuration system 204 receives the target list from the search interface (410).

Various embodiments of the search interface enable the admin 110 to input the target list in various ways. For example, some embodiments of the search interface include a text area into which the admin 110 can input the hostnames and IP addresses on the target list. In another example, some embodiments of the search interface include features that enable the admin 110 to indicate a file or other resource that contains the target list. In yet another example, some embodiments of the search interface include features that enable the admin 110 to input a range of IP addresses without individually inputting each IP address in that range.

Figure 5:
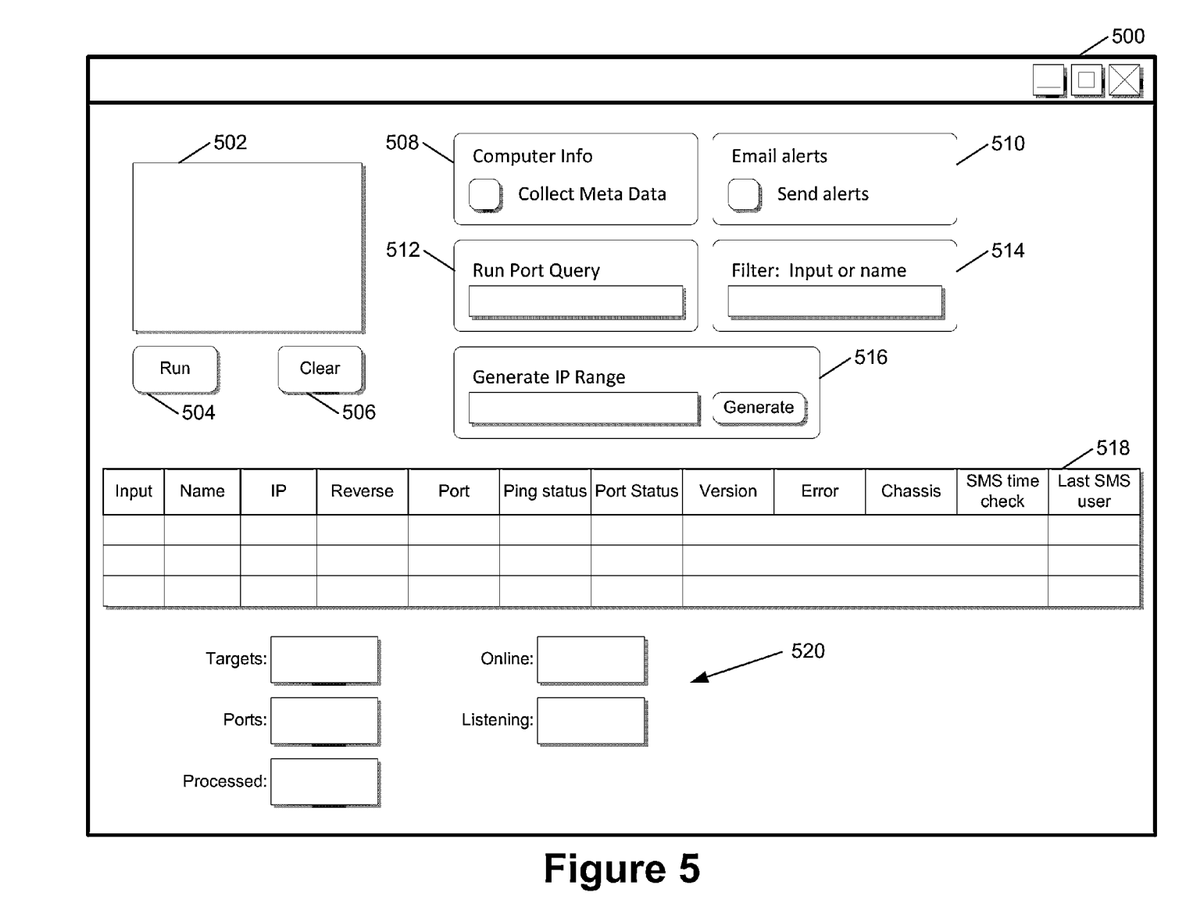
FIG. 5 is an example screen illustration for a search interface.

FIG. 5 is a screen illustration showing an example interface 500. Readers will appreciate that the interface 500 is merely one example. Other embodiments present other results interfaces. The interface 500 includes a list entry feature 502, a run control 504, a clear control 506, a metadata control 508, an alert control 510, a port query control 512, a filter control 514, a range control 516, a table 518, and statistics features 520.

The admin 110 inputs the target list by entering computer identifiers into the list entry feature 502. Alternatively, the admin 110 can input the target list by entering an IP address range in the range control 516. The admin 110 can clear hostnames and IP addresses from the list entry feature 502 by selecting the clear control 506.

Continuing reference is now made to the example of FIG. 4. After the configuration system 204 receives the target list, the collection system 206 performs a data collection operation (412). The data collection operation collects data from the computing devices identified on the target list. Various embodiments of the collection system 206 perform the data collection operation in various ways. For example, some embodiments perform the operation illustrated in FIG. 8 during data collection operations.

Various embodiments of the collection system 206 start the data collection operation in response to various events. In FIG. 5, for example, the admin 110 can instruct the collection system 206 start the data collection operation by selecting the run control 504. In the example of FIG. 5, the admin 110 can also use the metadata control 508, the alert control 510, and the port query control 512 to control aspects for the data collection operation. For example, the admin 110 can use the metadata control 508 to control whether the data collection operation collects particular types of metadata from the computing devices 104. The admin 110 can use the alert control 510 to control whether the scheduling system 108 provides email alerts to the admin 110 regarding changes to the computing devices 104. The collection system 206 uses the port indicated by the admin 110 in the port query control 512 to collect data from the computing devices 104.

Reference is now made again to the example of FIG. 4. After the data collection operation has started, the analysis system 208 uses data collected during the data collection operation to generate result data (414). The result data is based at least in part on the data collected during the data collection operation. In various embodiments, the analysis system 208 generates the result data at various times. For example, some embodiments of the analysis system 208 generate the result data after the data collection operation is complete. In another example, some embodiments of the analysis system 208 generate the result data from data collected before an end of the data collection operation.

The analysis system 208 presents a results interface to the admin 110 (416). The results interface displays at least some of the result data. In various embodiments, the results interface has various appearances and contains displays various data.

In the example of FIG. 5, the table 518 displays at least some of the result data. The table 518 has a set of column and a set of rows. Each of the columns corresponds to a different property. Each of the rows corresponds to a different computing device on the target list. Cells in the table 518 present the values of properties for the computing devices. The values in the cells are based on the data collected during the data collection operation. In some embodiments, the properties include the properties specified by configuration input received from the admin 110. In the example of FIG. 5, the properties are named "input," "name," "IP," "reverse," "port," "ping status," "port status," "version," "error," "chassis," "SMS time check," and "last SMS user." Readers will understand that these properties are examples and that other properties are possible.

As mentioned briefly above, the interface 500 also comprises statistics features 520. The statistics features 520 indicate data regarding the results of the data collection operation. For instance, in the example of FIG. 5, the statistics features 520 include a targets feature that indicates a total number of target computing devices, a ports feature indicating a number of ports accessed during the data collection operation, a processed field indicating how many of the target computing devices have returned data to the collection system 206 during the data collection operation. In addition, the statistics features 520 include an online feature that indicates a number of the target computing devices that are currently online. The statistics features 520 also include a listening feature that indicates how many of the target computing devices are listening for requests from the collection system 206.

Reference is now made again to the example of FIG. 4. Furthermore, the analysis system 208 identifies appropriate times to schedule tasks (418). In various embodiments, the analysis system 208 identifies appropriate times to schedule tasks in various ways. For example, the analysis system 208 can determine probabilities of the given computing device having network connectivity at various times and can determine probabilities of the given computing device being in use at various times. The analysis system 208 then adds the probabilities for corresponding times. The analysis system 208 can identify the time having a lowest combined probability as an appropriate time to schedule a task.

Figure 6:
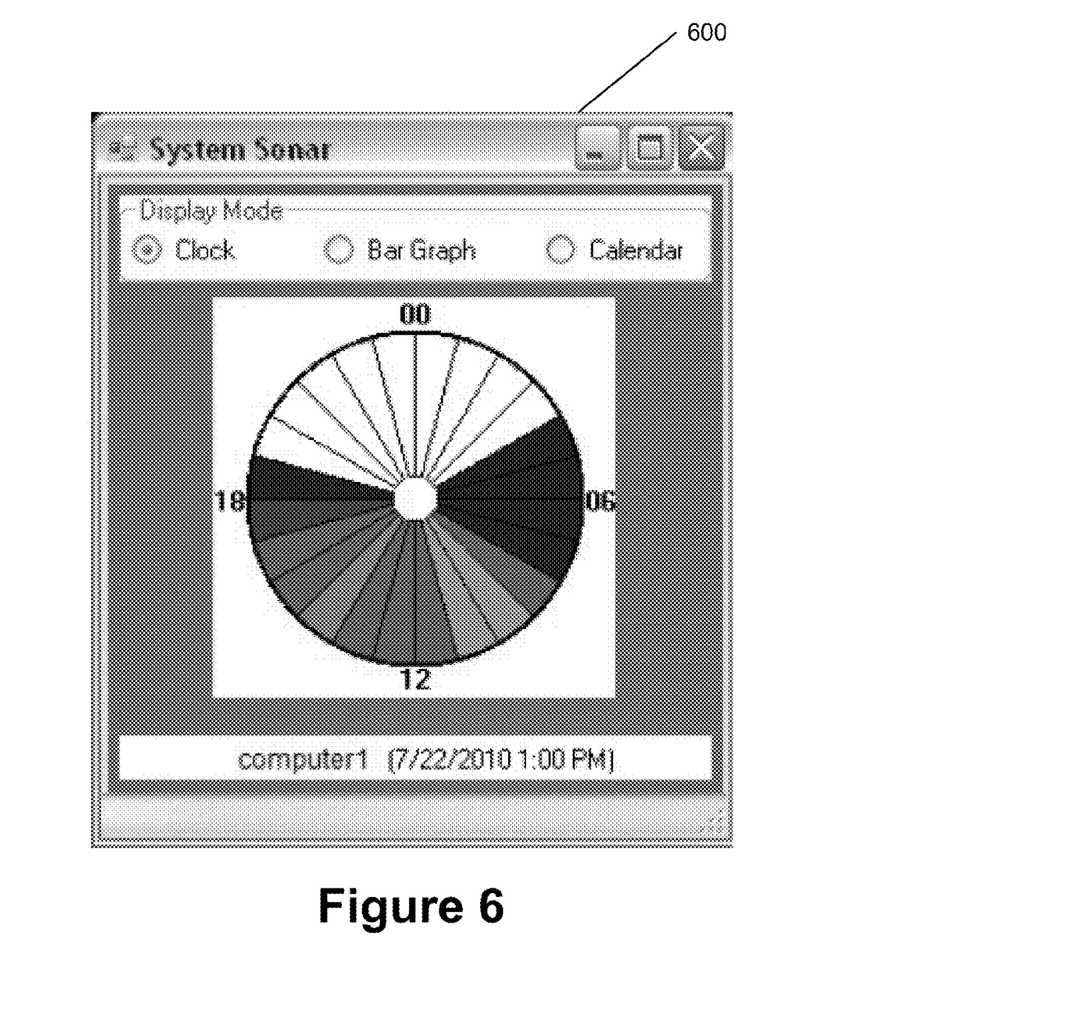
FIG. 6 illustrates an example screen illustration of an example clock interface for showing device usage data.

Some embodiments of the analysis system 208 present interfaces to the admin 110 that enable the admin 110 to identify appropriate times to schedule tasks. FIG. 6 is a screen illustration that shows an example clock interface 600. In the example of FIG. 6, the analysis system 208 assigns scores to hours of the day. In various embodiments, the analysis system 208 assigns the scores to hours in various ways. For example, some embodiments of the analysis system 208 assign relatively high scores to hours in which a given computing device is likely to have network connectivity and is not likely to be in use. In this example, the analysis system 208 assigns relatively low scores to hours in which the given computing device is likely to have little or no network connectivity and hours in which the given computing device is likely to be in use.

The clock interface 600 includes a set of circularly arranged wedges. Each of the wedges corresponds to a different hour of a day. The colors of the wedges are correlated to the scores of the corresponding hours. Lighter colors are correlated with lower scores. Darker colors are correlated with higher scores.

In the example of FIG. 6, wedges corresponding to the hours between 19:00 and 4:00 are white, indicating that these hours have low scores. The scores may be low during these hours because the given computing device is likely to be turned off at night and therefore have no network connectivity. Furthermore, the hours between 8:00 and 18:00 are relatively light, indicating that these hours have relatively low scores. The scores for these hours may be low because the given computing device may in use during these hours. The 18:00 hour and the hours between 4:00 and 8:00 are relatively dark, indicating that these hours have relatively high scores.

Figure 7:
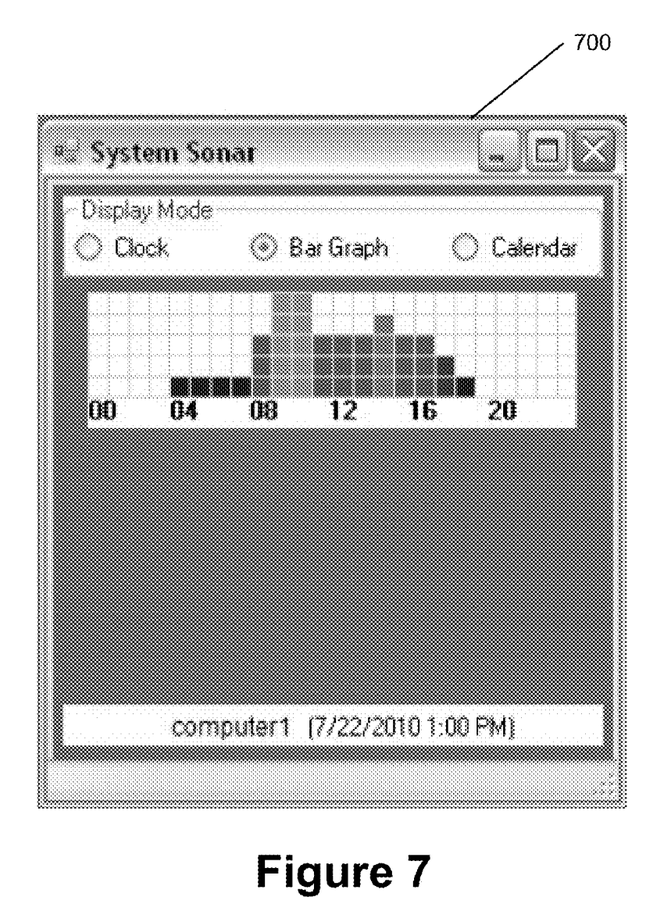
FIG. 7 illustrates an example screen illustration of a bar graph interface for showing a device usage data.

FIG. 7 is a screen illustration that shows an example bar graph interface 700. In the example of FIG. 7, the analysis system 208 assigns scores to hours of a day. In various embodiments, the analysis system 208 assigns scores in various ways. For example, the analysis system 208 can associate higher scores with higher probabilities that a given computing device is in use. The bar graph interface 700 includes columns for different hours of the day. The heights of the columns are correlated with the scores for the corresponding hours.

Reference is now made again to the example of FIG. 4. After identifying the appropriate times, the task system 210 schedules tasks (420). In various embodiments, the task system 210 schedules the tasks in various ways. For example, the task system 210 can present an interface to the admin 110. In this example, the interface comprises features that enable the admin 110 to provide task selection input to the task system 210. The task selection input specifies a task to be performed on a particular one of the computing devices 104 and a time at which that task is to be performed.

The task system 210 performs the tasks at the scheduled times (422). For example, the admin 110 can schedule the installation of a software patch on the computing device 104A at 4:30 a.m. on Jun. 15, 2011. In this example, the task system 210 can attempt to establish communication with the computing device 104A at 4:30 a.m. on Jun. 15, 2011. In this example, the task system 210 sends the software patch to the computing device 104A if communication is established.

Figure 8:
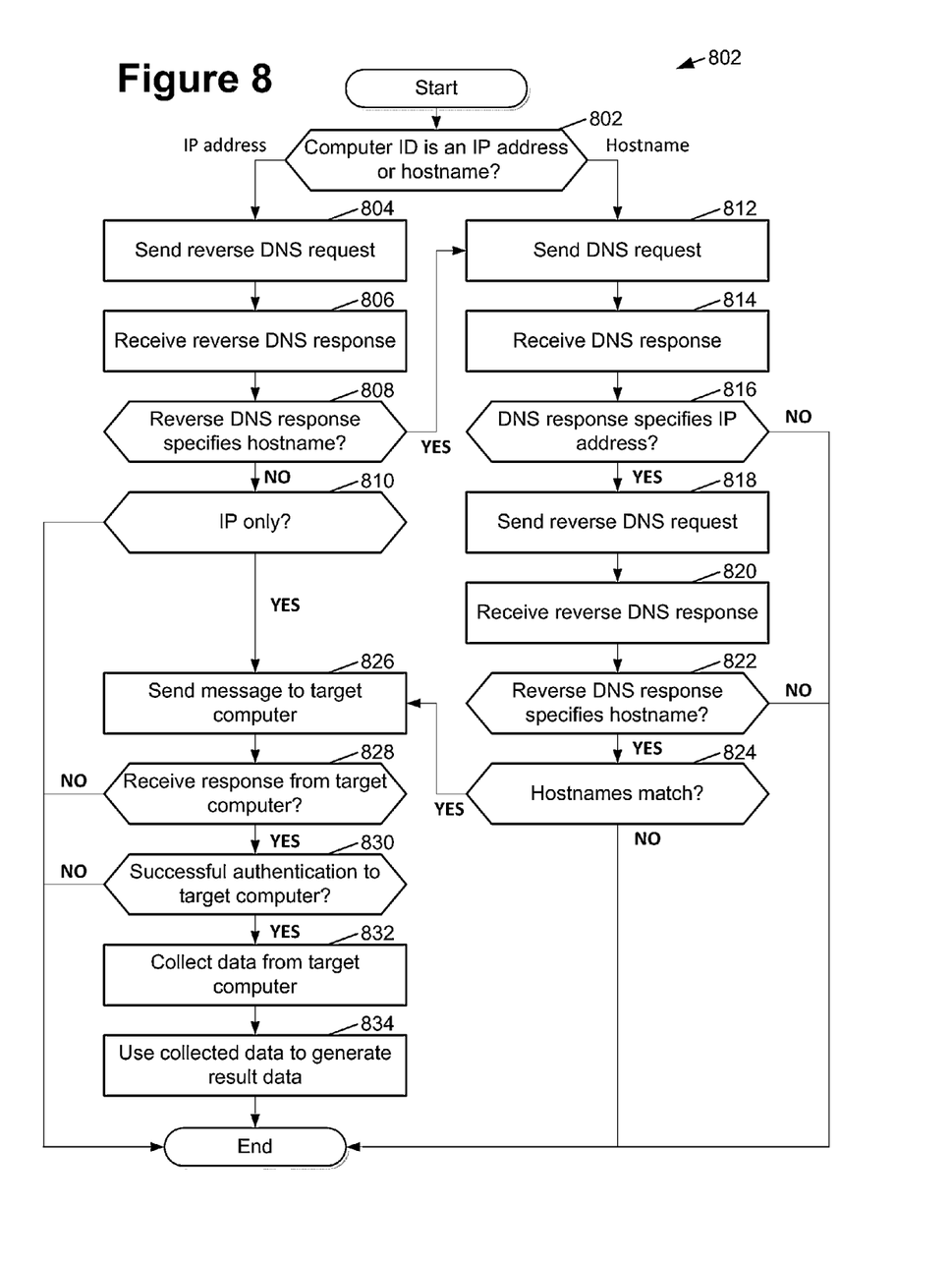
FIG. 8 is a flowchart illustrating an example operation to generate response data for a computer identifier.

FIG. 8 is a flowchart illustrating an example operation 800 performed during a data collection operation. The collection system 206 can perform the operation 800 for each computer identifier on the target list.

After the operation 800 starts, the collection system 206 determines whether the computer identifier is an IP addresses or a hostname (802). If the computer identifier is an IP address, the collection system 206 sends a reverse DNS request to the DNS server 202 (804). The reverse DNS request specifies the IP address. Subsequently, the collection system 206 receives a reverse DNS response from the DNS server 202 (806). If the DNS server 202 stores data that maps the IP address to a hostname, the reverse DNS response specifies the hostname. If the DNS server 202 does not store data that maps the IP address to a hostname, the reverse DNS response indicates an error.

After receiving the reverse DNS response, the collection system 206 determines whether the reverse DNS response indicates a hostname (808). If the reverse DNS response does not indicate a hostname ("NO" of 808), the collection system 206 determines whether the computer identifier only specifies an IP address (810). According to embodiments, the determination (810) is made to address a use case where a reverse DNS entry may not exist for an IP address in question. If an IP address is returned in lieu of a DNS name (YES of 810), the collection system 206 sends a message to a computing device associated with the IP address (826). If an IP address nor a DNS name is returned in response to the query (NO of 810), the operation 800 ends under these circumstances because the system may be required to work off a forward IP address or a DNS name alone.

On the other hand, if the reverse DNS response specifies a hostname ("YES" of 808) or if the computer identifier is a hostname, the collection system 206 sends a DNS request to the DNS server 202 (812). The DNS request specifies the hostname. Subsequently, the collection system 206 receives a DNS response from the DNS server 202 (814). If the DNS server 202 stores data that maps the hostname to an IP address, the DNS response specifies the IP address. If the DNS server 202 does not store data that maps the hostname to the IP address, the DNS response specifies an error.

After receiving the DNS response in step 814, the collection system 206 determines whether the DNS response specifies an IP address (816). If the DNS response specifies an IP address ("YES" of 816), the collection system 206 sends a reverse DNS request to the DNS server 202 (818). The reverse DNS request specifies the IP address indicated by the reverse DNS response received in step 814. The collection system 206 subsequently receives a reverse DNS response from the DNS server 202 (820). If the DNS server 202 stores data that maps the IP address to a hostname, the reverse DNS response specifies the hostname. If the DNS server 202 does not store data that maps the IP address to a hostname, the reverse DNS response indicates an error.

After receiving the reverse DNS response in step 820, the collection system 206 determines whether the reverse DNS response specifies a hostname (822). If the reverse DNS response specifies a hostname ("YES" of 822), the collection system 206 determines whether the hostname specified by the reverse DNS response received in step 820 matches either the hostname specified by the computer identifier of the hostname specified by the reverse DNS response received in step 806 (824). If these hostnames match ("YES" of 824), the collection system has greater assurance that the IP address specified by the computer identifier or the IP address specified by the DNS response received in step 814 is actually associated with the hostname.

On the other hand, if the hostnames do not match ("NO" of 824), the DNS response does not specify a hostname ("NO" of 822), or the DNS response does not specify an IP address ("NO" of 816), the operation 800 ends. The operation 800 ends under these circumstances because the collection system 206 is not sufficiently assured that the IP address corresponds to the hostname.

If the hostnames match ("YES" of 824) or the computer identifier is IP only ("YES" of 810), the collection system 206 sends a message to a computing device associated with the IP address (826). For ease of explanation, this document can refer to the computing device associated with the IP address as the "target computer."

Subsequently, the collection system 206 determines whether the collection system 206 received a response to the message from the target computer (828). If the collection system 206 did not receive a response to the message ("NO" of 828), the target computer is not online. Because the target computer is not online, the collection system is unable to collect data from the target computer. Accordingly the operation 800 ends with regard to the target computer.

On the other hand, if the collection system 206 received a response to the message ("YES" of 828), the collection system 206 determines whether the collection system 206 is able to successfully authenticate itself to the target computer (830). If the collection system 206 is not successfully authenticated to the target computer ("NO" of 830), the collection system 206 is unable to collect data from the target computer. Accordingly, the operation 800 ends with regard to the target computer.

Various embodiments of the collection system 206 determine whether the collection system 206 is able to successfully authenticate themselves to the target computer in various ways. For example, the collection system 206 can send an authentication request to the target computer. The authentication request comprises credentials, such as an authentication token or password. In this example, the target computer responds to the authentication request with an authentication response. The authentication response indicates whether the collection system 206 successfully authenticated to the target computer.

If the collection system 206 successfully authenticates to the target computer ("YES" of 830), the collection system 206 communicates with the target computer to collect data from the target computer (832). In various embodiments, the collection system 206 communicates with the target computer in various ways. For example, in some embodiments, collection processes run on computing devices 104. The collection processes generate data regarding the computing devices 104. For example, the collection processes can generate data indicating when the computing devices 104 have network access and data indicating when the users 106 log in to the computing devices 104. In some embodiments, the collection processes run in the background and the users 106 are unaware that the collection processes are running on the computing devices 104. In this example, the collection system 206 can communicate with the collection process on the target computer to collect data from the target computer.

After collecting the data from the target computer, the collection system 206 uses the collected data to generate result data (834). In the example of FIG. 5, a row of the table 518 can display the result data. In various embodiments, the collection system 206 generates the result data in various ways. For example, the collection system 206 can perform one or more transformations or operations on the collected data to generate the result data. After generating the result data, the operation 800 ends with regard to the target computer. The collection system 206 can repeat the operation 800 with regard to another computer identifier in the target list.

Figure 9:
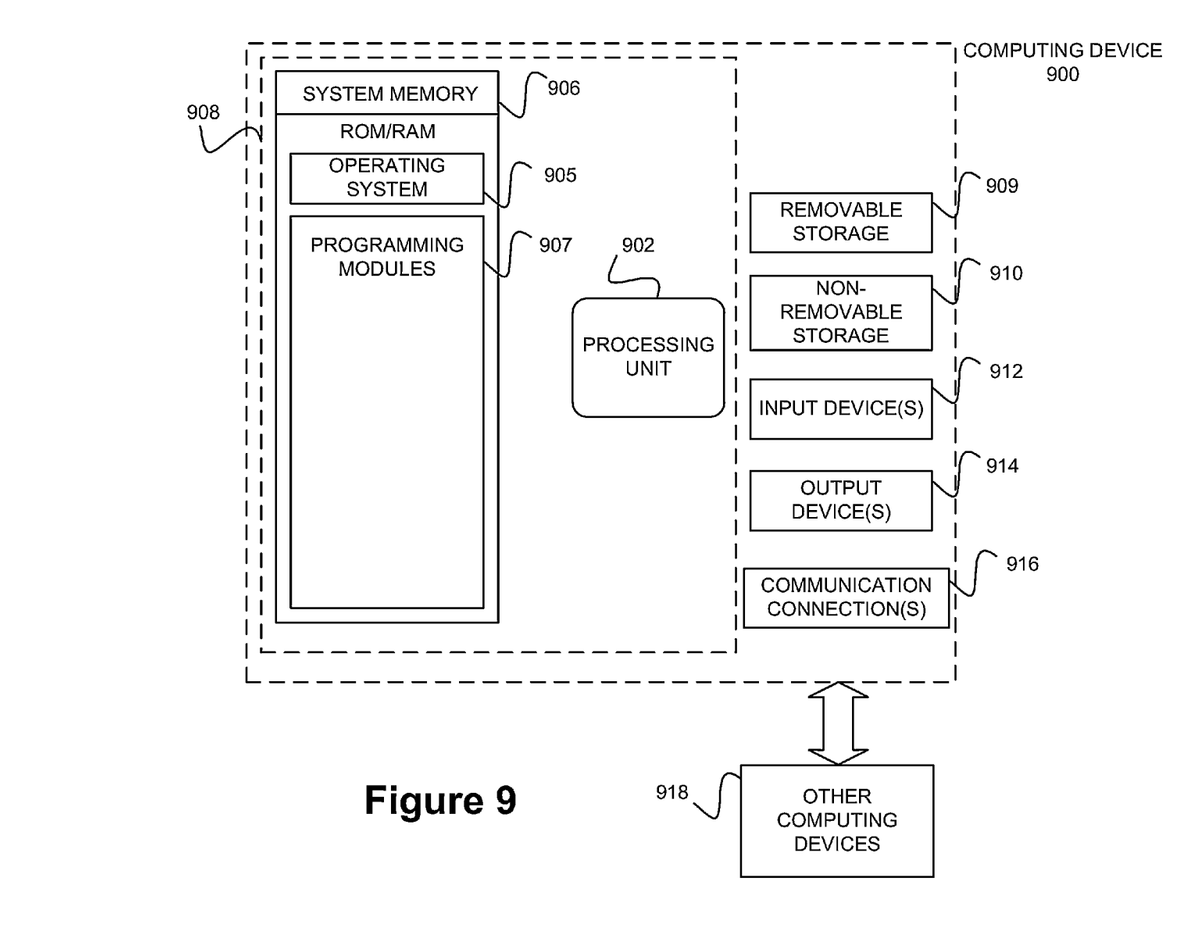
FIG. 9 is a block diagram illustrating an example computing device.

FIG. 9 is a block diagram illustrating an example computing device 900. In some embodiments, the computing devices 104 and the scheduling system 108 comprise one or more computing devices like the computing device 900. It should be appreciated that in other embodiments, the computing devices 104 and the scheduling system 108 can comprise computing devices having hardware components other than those illustrated in the example of FIG. 9.

Consistent with some embodiments, the aforementioned memory storage and processing unit may be implemented in a computing device, such as computing device 900 of FIG. 9. Any suitable combination of hardware, software, or firmware may be used to implement the memory storage and processing unit. For example, the memory storage and processing unit may be implemented with computing device 900 or any other computing devices 918, in combination with computing device 900, wherein functionality may be brought together over a network in a distributed computing environment, for example, an intranet or the Internet, to perform the functions as described herein. The aforementioned system, device, and processors are examples and other systems, devices, and processors may comprise the aforementioned memory storage and processing unit, consistent with some embodiments.

With reference to FIG. 9, a system consistent with some embodiments includes a computing device, such as computing device 900. In a basic configuration, computing device 900 may include at least one processing unit 902 and a system memory 906. Depending on the configuration and type of computing device, the system memory 906 may comprise, but is not limited to, volatile (e.g. random access memory (RAM)), non-volatile (e.g. read-only memory (ROM)), flash memory, or any combination. The system memory 906 may include operating system 905 and one or more programming modules 907. The operating system 905, for example, may be suitable for controlling the operation of the computing device 900. Furthermore, some embodiments are practiced in conjunction with a graphics library, other operating systems, or any other application program and is not limited to any particular application or system. FIG. 9 illustrates this basic configuration by those components within a dashed line 908.

The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage 909 and a non-removable storage 910. The computing device 900 may also contain a communication connection 916 that may allow the computing device 900 to communicate with other computing devices 918, such as over a network in a distributed computing environment, for example, an intranet or the Internet. The communication connection 916 is one example of communication media.

The system memory 906 can store one or more program modules and data files, including the operating system 905. In addition, the system memory 906 can store instructions that, when executed, cause the computing device 900 to provide the configuration system 204, the collection system 206, the analysis system 208, the task system 210, and/or a collection process. The aforementioned process is an example, and the processing unit 902 may perform other processes. Other programming modules that may be used in accordance with some embodiments include electronic mail and contacts applications, word processing applications, spreadsheet applications, database applications, slide presentation applications, drawing or computer-aided application programs, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments can be implemented in hardware and/or in software (including firmware, resident software, micro-code, etc.). In other words, embodiments may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 906, the removable storage 909, and the non-removable storage 910 are computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of the computing device 900. The computing device 900 also comprises one or more input devices 912 and one or more output devices 914. Example types of include devices include keyboards, mice, pens, sound input devices, touch input devices, etc. Example types of output devices include displays, speakers, printers, etc. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

The invention claimed is:

1. A method for scheduling a task, the method comprising:
receiving a computer identifier including a first IP address;
collecting during a time period, by a first computing device, data from a second computing device, the second computing device associated with the first IP address;
in response to the second computing device obtaining a second IP address during the time period, obtaining a first hostname by performing a first reverse lookup operation on the first IP address and, after obtaining the first hostname, obtaining the second IP address by performing a forward lookup operation on the first hostname;
obtaining a second hostname by performing a second reverse lookup operation on the second IP address;
determining whether the first hostname and the second hostname match; and
after determining that the first hostname matches the second hostname, collecting during the time period, by the first computing device, data from the second computing device using the second IP address;
associating the data collected based on both the first and second IP addresses during the time period with the second computing device, the data indicating times at which the second computing device had network connectivity and indicating times at which one or more users were using the second computing device during the time period based upon the first and second IP addresses;
using the data to identify a time at which the second computing device is likely to have network connectivity and at which the one or more users are not likely to be using the second computing device; and
scheduling a task to occur on the second computing device at the identified time.

2. The method of claim 1,
wherein the method further comprises:
using the first IP address to collect the data about the second computing device after determining that the first hostname matches the second hostname.

3. The method of claim 2, wherein receiving the computer identifier comprises receiving a range of IP addresses that includes the first IP address.

4. The method of claim 2,
wherein performing the first reverse lookup operation comprises:
sending a reverse Domain Name System (DNS) request to a DNS server, the reverse DNS request specifying the first IP address; and
receiving a reverse DNS response from the DNS server, the reverse DNS response specifying the first hostname; and
wherein performing the forward lookup operation comprises:
sending a forward DNS request to the DNS server, the forward DNS request specifying the first hostname; and
receiving a forward DNS response from the DNS server, the forward DNS response specifying the second IP address.

5. The method of claim 1, further comprising communicating, by the first computing device, with the second computing device at the identified time to perform the task.

6. The method of claim 5, wherein communicating with the second computing device comprises sending a software patch to the second computing device.

7. The method of claim 5, wherein communicating with the second computing device comprises copying data from the second device to the first computing device.

8. The method of claim 1, wherein receiving the computer identifier comprises receiving a target list, the target list listing a plurality of computer identifiers, the plurality of computer identifiers including the computer identifier, the plurality of computer identifiers including hostnames and IP addresses.

9. The method of claim 1,
wherein the method further comprises: receiving configuration input, the configuration input specifying a plurality of properties; and
wherein collecting the data from the second computing device comprises collecting data specifying values for properties in the plurality of properties.

10. The method of claim 1, wherein collecting the data from the second computing device comprises collecting the data from a collection process running in the background on the second computing device.

11. The method of claim 1, further comprising: receiving task selection input, the task selection input specifying the task.

12. The method of claim 1, further comprising presenting a clock interface, the clock interface having circularly arranged wedges corresponding to different hours of a day, colors of the wedges being correlated to scores for the corresponding hours, the scores for the corresponding hours based on the likelihood that the second computing device has network connectively during the corresponding hours and no one is using the second computing device during the corresponding hours.

13. A computing device comprising:
a computer storage medium that stores instructions; and
a processing unit that executes the instructions, execution of the instructions by the processing unit causing the computing device to:
receive a target list, the target list comprising a plurality of computer identifiers;
determine whether the computer identifier is an IP address or a hostname; after determining that a computer identifier is a first IP address, obtain a first hostname by performing a first reverse lookup operation on the first IP address, and after obtaining the first hostname, obtaining a second IP address by performing a forward DNS operation on the first hostname;
after obtaining the second IP address, obtain another hostname by performing the reverse DNS operation on the second IP address;
determine whether the hostname matches and the other hostname; and
for the first and second IP addresses in the target list:
collect and associate data based on the first and second IP addresses from a computing device associated with the first and second IP addresses;
use the data to identify an appropriate time to perform a task on the computing device; and
scheduling a task to occur on the computing device associated with the first and second IP addresses.

14. The computing device of claim 13, wherein the appropriate time is a time when the computing device associated with the first and second IP addresses is likely to have network connectivity and is unlikely to be in use.

15. The computing device of claim 13, wherein execution of the instructions by the processing unit causes the computing device to perform the task by communicating with the computing device associated with the first and second IP addresses.

16. The computing device of claim 13, wherein execution of the instructions by the processing unit causes the computing device to collect the data from the computing device associated with the computer identifier by communicating with a collection process running on the computing device associated with the first and second IP addresses.

17. A computer readable storage device that stores instructions, execution of the instructions by a processing unit of a computing device causing the computing device to:
present a user interface;
receive a target list through the user interface, the target list comprising a plurality of computer identifiers;
for each computer identifier in the target list that is a first IP address:
obtain a first hostname by performing a first reverse lookup operation on the first IP address;
after obtaining the first hostname, obtain a second IP address by performing a forward lookup operation on the first hostname;
obtain a second hostname by performing a second reverse lookup operation on the second IP address;
determine whether the first hostname matches the second hostname; and
use the first and second IP address to collect data about a given computing device after determining that the first hostname matches the second hostname, the given computing device having the first and second IP address;
associating the data collected based on the first and second IP addresses with the given computing device;
use the data to identify a time at which the given computing device is likely to have network connectivity and at which one or more users are not likely to be using the given computing device; and
schedule a task to occur on the given computing device at the identified time; and
for each computer identifier in the target list that is a hostname:
obtain a given IP address by performing the forward lookup operation on the hostname;
after obtaining the given IP address, obtain a third hostname by performing a reverse lookup operation on the given IP address;
determine whether the hostname and the third hostname match;
use the given IP address to collect the data about the second computing device after determining that the first hostname matches the third hostname;
use the data to identify a time at which the given computing device is likely to have network connectivity and at which the one or more users are not likely to be using the given computing device; and
schedule a task to occur on the given computing device at the identified time.

* * * * *